United States Patent [19]

Horner et al.

[11] 4,004,993

[45] Jan. 25, 1977

[54] ELECTROLYTIC TRAPPING OF IODINE FROM PROCESS GAS STREAMS

[75] Inventors: Donald E. Horner; James C. Mailen, both of Oak Ridge; Franz A. Posey, Concord, all of Tenn.

[73] Assignee: The United States of America as represented by the United States Energy Research and Development Administration, Washington, D.C.

[22] Filed: Feb. 26, 1976

[21] Appl. No.: 661,571

[52] U.S. Cl. .............................. 204/131; 204/130
[51] Int. Cl.² ......................................... C25B 1/24
[58] Field of Search .......... 204/130, 131, 149, 151; 423/240

[56] References Cited

UNITED STATES PATENTS

| | | |
|---|---|---|
| 3,752,876 | 8/1973 | Cathers et al. .................... 423/240 |
| 3,793,171 | 2/1974 | Zabolotny et al. ................ 204/130 |
| 3,852,407 | 12/1974 | Schmitt et al. .................... 423/240 |

*Primary Examiner*—R. L. Andrews
*Attorney, Agent, or Firm*—Dean E. Carlson; David S. Zachry; Allen H. Uzzell

[57] ABSTRACT

A method for removing molecular, inorganic, and organic forms of iodine from process gas streams comprises the electrolytic oxidation of iodine in the presence of cobalt-III ions. The gas stream is passed through the anode compartment of a partitioned electrolytic cell having a nitric acid anolyte containing a catalytic amount of cobalt to cause the oxidation of effluent iodine species to aqueous soluble species.

6 Claims, 3 Drawing Figures

ELECTROLYTIC TRAPPING OF IODINE FROM PROCESS GAS STREAMS

BACKGROUND OF THE INVENTION

This invention was made in the course of, or under a contract with the Energy Research and Development Administration.

It relates to the art of scrubbing process gas streams to remove iodine, either molecular iodine, or organic or inorganic iodine compounds. This method has particular utility in the nuclear industry for removing radioactive iodine from gaseous effluents of nuclear fuel reprocessing operations.

Effluent gas streams from neutron-irradiated fuel reprocessing facilities typically contain radioactive iodine (a fission product) as molecular iodine and inorganic and organic iodide compounds. Any iodine scrubbing process must be effective for all forms of iodine and must provide for the ultimate concentration of the radioiodine for waste treatment or ultimate disposal.

Prior Art

The iodine removal problem is well known in the prior art. Methods for iodine removal generally fall into two categories: sorbtion on solid sorbents and oxidative dissolution in aqueous nitric acid solution. The solid sorbent processes utilize activated carbon, activated carbon impregnated with various organic amines, iodized charcoal, and silver zeolite sorbent. Solid sorbents, particularly silver zeolite, give excellent results, but their high cost limits their use to the removal of only trace amounts of iodine. Generally, solid sorbents are undesirable for large-scale fuel reprocessing operations because of problems associated with mass transfer of radioactive species and the dissipation of radiolytic heat on static sorbent beds.

Liquid phase processes are much preferred because of the ease of mass transport and heat dissipation. One liquid phase gas scrubbing process which is very effective for removing molecular, organic, or inorganic iodine is the "Iodox" process, more fully described in U.S. Pat. No. 3,752,876 to Cathers et al., issued Aug. 14, 1973. In this process effluent gas is passed through refluxing fuming nitric acid to oxidize iodine to nonvolatile iodate. The chief disadvantage of the Iodox process is the need for hyperazeotropic nitric acid (15.3–24M) which must be manufactured by a special process.

SUMMARY OF THE INVENTION

It is an object of this invention to provide a method for trapping molecular, inorganic and organic forms of iodine from process gas streams which requires only readily available reagents and concentrates the recovered iodine into a liquid phase for easy handling. These and other objects are accomplished by providing a method of removing molecular, inorganic, and organic forms of iodine from a gaseous atmosphere, said method comprising contacting said gaseous atmosphere with anolyte of an operating partitioned electrolytic cell, said electrolytic cell comprising an anode compartment containing anolyte and a cathode compartment containing catholyte, said anolyte comprising an aqueous nitric acid solution containing a catalytic amount of cobalt ions to effect the oxidation of iodine present in the atmosphere to species soluble in the anolyte. The nitric acid concentration required in the anolyte is sub-azeotropic and may be as low as 1 M. If desired, the nitric acid concentration may be as high as 16 M. The preferred concentration range is 8 M–16 M. The cobalt concentration may be as low as 0.01 M with at least 0.1 M preferred. Cobalt may be added as any soluble Co(II) or Co(III) compound that does not interfere with the reactions in our method or form precipitates. Co(II) nitrate is preferred since it adds no additional ionic species to the system.

DETAILED DESCRIPTION

Figure 1:
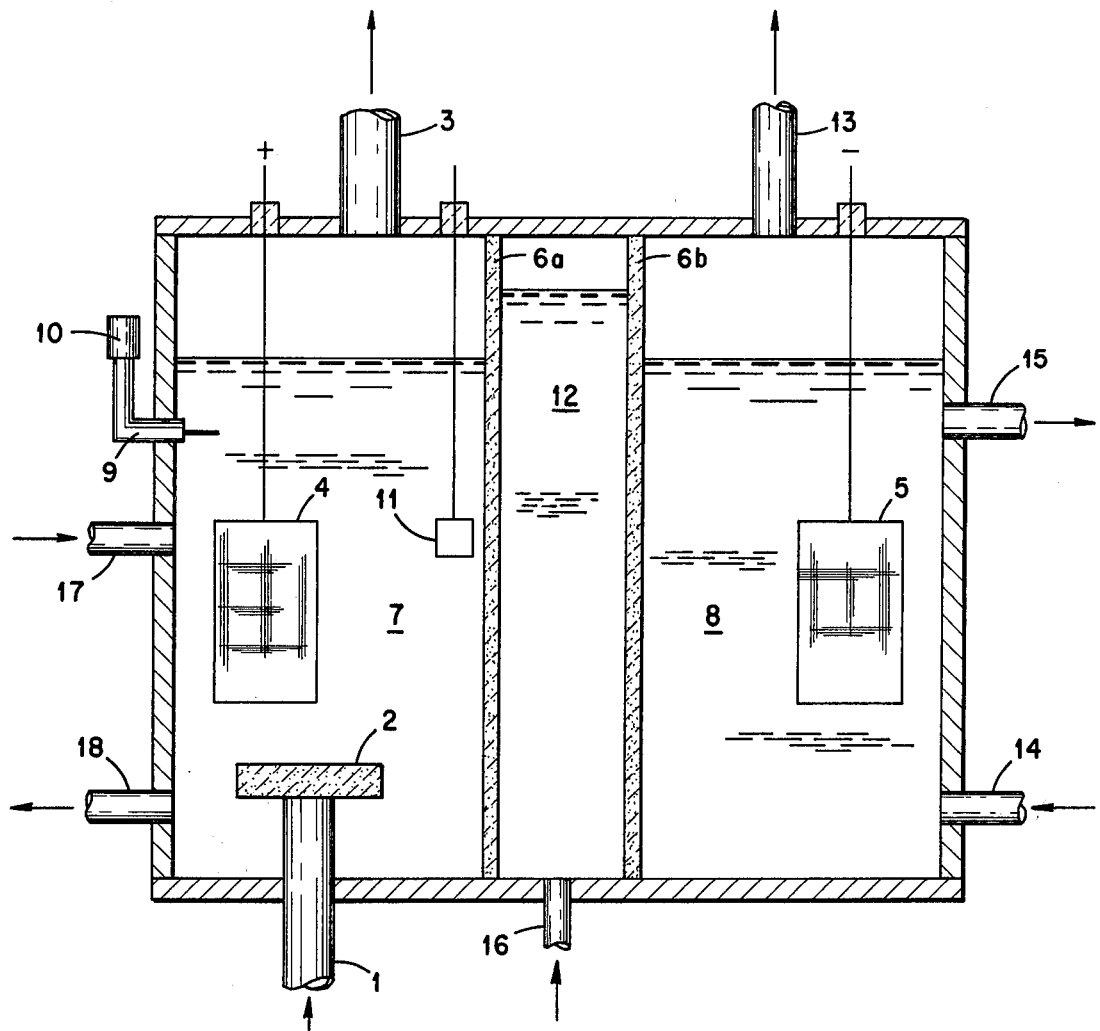
FIG. 1 is an electrolytic cell having a preferred configuration for carrying out the method of our invention.

The efficiency of an iodine trapping process is indicated as a decontamination factor, DF. The DF is the ratio of the iodine concentrations of entering gas to exiting gas and is always greater than or equal to 1. In order for an iodine trapping system to be suitable for large-scale fuel reprocessing operations, it is generally necessary that the system have an overall decontamination factor of about 100 for molecular iodine and about 10 methyl iodide. Methyl iodide DF is the standard for organic iodine compounds because it is the most abundant organic iodine compound in nuclear fuel processing effluents as well as being difficult to remove. The required overall DF is normally obtained by stagewise scrubbing, so the higher DF obtainable in a single stage, the fewer stages required.

An inventive aspect of our invention is the discovery that molecular, inorganic, and organic forms of iodine can be efficiently trapped from a process gas stream in a relatively dilute nitric acid solution containing a catalytic amount of cobalt under electrolytic oxidation conditions. In our process, iodine is trapped by passing the effluent gas through the nitric acid anolyte containing cobalt ions in an operating partitioned electrolytic cell. Volatile iodine species present in the process gas stream are effectively oxidized to species soluble in the anolyte.

The mechanism of the cobalt-catalyzed electrolytic oxidation of volatile iodine species in nitric acid is not understood. It is believed that cobalt II forms a soluble complex which is more readily oxidized (to cobalt III) than the volatile iodine species in the process gas. Once oxidized, the cobalt III is believed to act as a strong oxidizing agent which oxidizes volatile iodine species to soluble iodates and periodates, being itself reduced to cobalt II. Experimental results with our process indicate that the catalytic oxidations of molecular iodine and iodide compounds occur by different mechanisms (as indicated by the slopes of the lines in FIG. 3) and that cobaltic ion catalyzes each reaction. While it is known that some metal ions may catalyze anodic oxidation in simple ionic solutions, the overall beneficial function of cobalt in our process was unpredictable and surprising. Experiments with other oxidizing agents in an identical electrolytic system gave undesirable results and low decontamination factors. For example, in 4 M $HNO_3$, 0.01M permanganate gave a good DF for methyl iodide but resulted in a coating of $MnO_2$ on all surfaces. Ferric ion gave a low DF of about 2 or less. Ceric ion gave a DF of about 5 for methyl iodide, but resulted in a precipitate, probably of ceric periodate. Divalent silver probably gives initially high DF but total precipitation of the silver occured at the end of a run. Dichromate gave a DF of only about 9, apparently due to poor reaction kinetics at the anode.

Since the formation of precipitates detracts from the efficiency of the cell and necessitates constant addition of catalyst and periodic removal of accumulated solids, only cobalt, which demonstrated DF's as high as 600 for elemental iodine and 100 for methyl iodide, with no insoluble precipitate, is suitable for catalytic oxidation of volatile iodine species. It is not completely understood why cobalt results in such high DF's in our process, but it is apparently due partly to excellent reaction kinetics at the anode surface for the oxidation of Co(II) to Co(III) and excellent kinetics for the reaction of the oxidized cobalt III ion with the various forms of iodine in the effluent gas. To appreciate more fully the efficiency of our process one should consider that a methyl iodide DF of 100 is obtainable on a laboratory scale merely by sparging through the dilute nitric acid anolyte, while the Iodox process requires fuming nitric acid to effect stage DF's smaller by about a factor of 10 or more.

In order to remove molecular, inorganic, and organic iodine from a gaseous atmosphere according to our invention, all that is necessary is that the atmosphere be contacted with the anolyte of an operating partitioned electrolytic cell, the anolyte comprising a dilute nitric acid solution containing a catalytic amount of cobalt ions. The cobalt ions may be provided as any soluble cobalt salt. Cobalt II ions are oxidized in the anolyte to cobalt III which catalyze the reaction. Upon contact with the anolyte, volatile iodine species in the atmosphere are oxidized to form iodine species soluble in the anolyte. A partitioned electrolytic cell is necessary in our process to prevent the mixing of reaction products. In our process it is necessary that the partition completely separate the anolyte from the cathode compartment to prevent soluble radioactive iodine species such as iodates and periodates from being reduced at the cathode into volatile molecular iodine. Furthermore, the complete isolation of the electrode compartments is desirable to prevent contamination of the cathode compartment with radioactive species.

FIG. 1 is a preferred example of a partitioned electrolytic cell capable of carrying out the method of our invention. It comprises an anode compartment 7 containing the anolyte, an intermediate compartment 12, and a cathode compartment 8 containing the catholyte. The electrolyte containing a dissolved Co(II) salt, is added to each compartment. During operation, cobalt ions in the anolyte are oxidized to Co(III). Process gas containing radioactive iodine species enter gas inlet line 1 where it passes through a gas dispersion frit 2 and is sparged through the anolyte. The scrubbed gas passes through gas outlet line 3 where it exits through the stack and is passed to another scrubbing stage. The anode 4 is preferably platinum mesh or platinum coated titanium mesh. Regardless of material or configuration, the anode must be resistant to oxidative corrosion in $HNO_3$. The cathode 5 may be any material resistant to nitric acid attack such as stainless steel. Gaseous products at the cathode exit through cathode exit line 73. Makeup electrolyte flows through intermediate line 16 into the intermediate chamber 12. Porous ceramic partitions 6a and 6b separate the anode compartment from the intermediate compartment and the intermediate compartment from the cathode compartment. Suitable ceramics include alumina and fritted glass. The electrolyte level in the intermediate compartment is maintained at a higher level than in the anode and cathode compartments to provide a small flow of fresh liquid into both the anode and cathode compartments so as to prevent diffusion of ionic iodine species through the partitions.

If necessary, the catholyte nitric acid concentration can be maintained by adding fresh nitric acid through fresh catholyte line 14. Spent catholyte exits through spent catholyte line 15. In the anode compartment, electrolyte enters anoltye line 17 and exits anolyte exit line 18. In a staged operation with a stage sequence in the direction of gas flow, the anolyte of the stages circulate among the anode compartments of the cells countercurrently to the process gas to concentrate soluble iodine species in the anode compartment of the first of the cells in series. Accordingly, in FIG. 1, electrolyte from the next higher stage enters the anolyte through line 17 and exits anolyte exit line 18 to enter an earlier stage; thus, fresh electrolyte is supplied to the last stage and the trapped iodine product stream is withdrawn from the first stage.

Current passing through the electrolytic cell is carried through the intermediate compartment mainly by hydrogen ions. The anolyte potential is monitored by standard electrode 10 through electrolyte bridge 9, with reference to unpowered electrode 11. Control of the anolyte potential is easily accomplished by regulating the potential applied across the anode and cathode by the power source (not shown).

Figure 2:
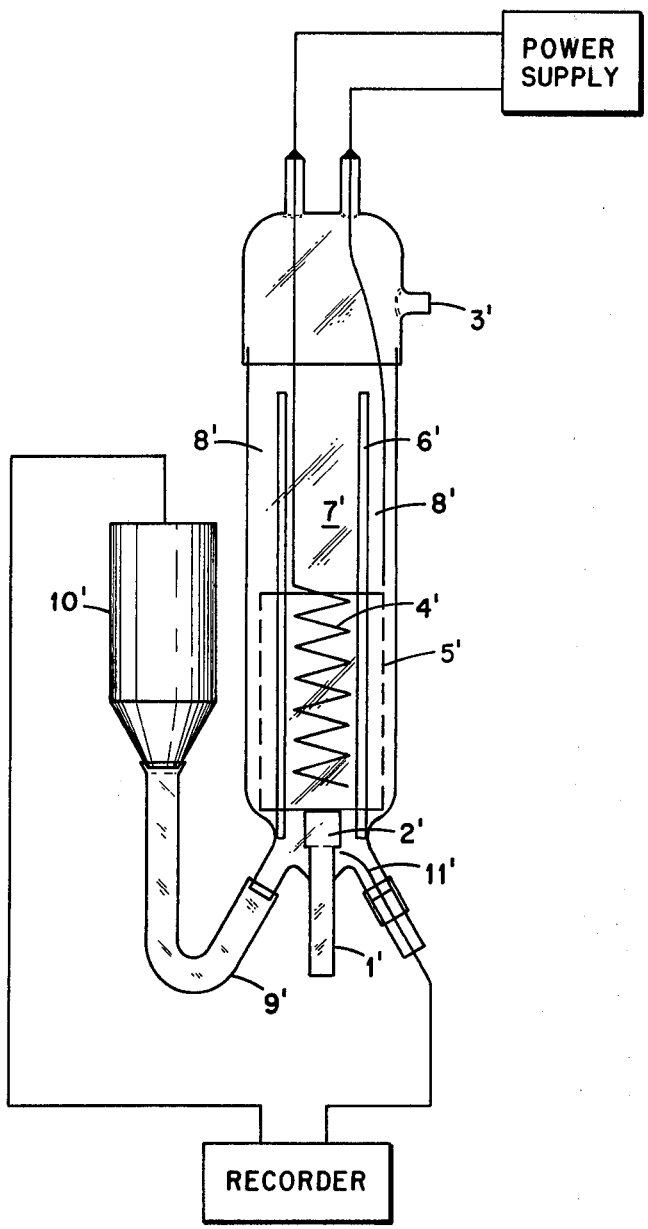
FIG. 2 is a laboratory scale electrolytic cell used to perform experimental runs of our method.

FIG. 2 is a laboratory scale electrolytic cell apparatus used to demonstrate the effectiveness of our method. The apparatus comprises an effluent gas inlet (1') a fritted glass gas dispersion frit (2') and a gas outlet (3'). The platinum mesh anode (4') is separated from the platinum mesh cathode (5') by a cylindrical microporous aluminum oxide barrier (6'), which divides the apparatus into a central anode compartment (7') and peripheral annular cathode compartment (8'). The barrier had a porosity of 40%. A liquid bridge (9') connects the anode compartment to a saturated calomel electrode (10'). An auxiliary unpowered platinum wire electrode (11') is disposed within the anode compartment to detect the anolyte potential. The anolyte potential vs. the SCE are recorded on the recorder.

During operation, the anode and cathode compartments are filled with electrolyte. The cathode compartment is filled to a higher level than the anode compartment to provide a slight pressure differential to prevent flow of ionic species through the barrier. Effluent gas enters the gas inlet and is dispersed by the gas dispersion frit and bubbles through the anolyte and out the gas outlet. Power is supplied across the operating electrode and the anolyte potential vs. SCE is recorded on the recorder. This apparatus is not intended to represent a best mode, but only to demonstrate the simplicity of our method. As indicated earlier, the cathode compartment should be completely isolated from the effluent gas to prevent contamination of the catholyte with radioiodine and necessitate the handling of two radioactive waste streams. Based upon the information in this disclosure, it is within the skill of the art to magnify our method to industrial scale. At least some iodine trapping is obtainable in our process with dilute nitric acid (less than 4 M), small concentrations of cobalt (less than 0.01 M) and small current densities. Experiments have indicated that higher decontamination factors for both molecular iodine and methyl iodide (indicating higher DF's for other iodine compounds) are obtainable with more concentrated nitric acid, greater cobalt concentration in the anolyte, more current through the cell, and higher anode potentials (indicating higher Co(III)/Co(II) ratio in the anolyte).

The preferred operating conditions in our process are determined by the corrosion resistance of the containment equipment and the desired cathode products. The preferred acid concentration in our process is 8 M $HNO_3$ for both anolyte and catholyte. If less than 8 M is present in the cathode compartment, $H_2$ will be produced as the reduction product. Greater than 8 M $HNO_3$ in the anolyte does not result in any large iodine removal advantage and is more corrosive.

The desired cathode product for industrial applications is $HNO_2$. This is achieved by regulating the current density according to the acid concentration. At lower current densities, the cathode reduction product is nitrous acid. At a transition value, about $5 \times 10^{-4}$ A/cm$^2$ for 4 M $HNO_3$ and 0.4 A/cm$^2$ for 8 M $HNO_3$, an abrupt change over to hydrogen production occurs. The cathode product is mainly ammonia at current densities above $3.6 \times 10^{-2}$ A/cm$^2$ for 8 M $HNO_3$. Though small amounts of $H_2$ are essentially evolved even below these transition values, a small amount of soluble nitrite salt in the catholyte effectively suppresses $H_2$ formation. Accordingly, the electrolytic cell should be operated at a current density sufficiently low to prevent the formation of $NH_3$ in the cathode compartment.

The preferred electrolyte concentrations are 8 M $HNO_3 - 0.1$ M $Co(NO_3)_2$ for the anolyte and 8 M $HNO_3$ with a trace amount of soluble nitrite (such as $NaNO_2$) for the catholyte. For these concentrations, a current density of less than about $3.6 \times 10^{-2}$ A/cm$^2$ with respect to the cathode will prevent the formation of $NH_3$ in the cathode compartment.

Nuclear fuel reprocessing effluent gases normally contain $NO_2$ which would compete with the iodine for Co(III) in the anolyte. Experiments have shown that as little as 3 vol. % $NO_2$ in the effluent gas renders a stage incapable of trapping iodine or methyl iodine. However, our oxidative trapping method is also effective for trapping $NO_2$. At 2 vol. % $NO_2$ in the effluent feed gas, 90% of $NO_2$ is trapped in one stage. This is particularly fortunate since in a stagewise system about 99% of the initial $NO_2$ would be effectively absorbed in the first one or two stages. These stages wuld have low DF's for iodine and iodides but the remaining steps would be virtually unaffected by the initial $NO_2$ concentration.

The following table gives experimental results of decontamination runs at various acid concentrations, cobalt concentrations, currents, and $NO_2$ concentrations. The tests were performed in a partitioned glass electrolytic cell as shown in FIG. 2 with platinum mesh electrodes. The anode surface was 236 cm$^2$ and the cathode surface was 172 cm$^2$. Air contaminated with I$^2$ (20–40 vol. ppm) or CH$_3$I (100 vol. ppm) was bubbled through a 30 ml. anolyte solution at a rate of about 1350 ml. min. In each run, the cobalt was added to the anolyte as Co(II) nitrate and the current allowed to run for several minutes to establish electrochemical equilibrium between Co(II) and Co(III).

Table I

Electrolytic decontamination of $I_2$ in $HNO_3$—$Co^{3+}$

| $HNO_3$ conc. (M) | Fraction of NO gas in feed (vol. %) | Current (A) | Cobalt conc. (M) | Decontamination factor (DF) |
|---|---|---|---|---|
| 4 | 0 | 1 | 0.01 | 189; 265 |
| 4 | 0 | 4 | 0.01 | 73; 81; 82; 113 |
| 4 | 2 | 4 | 0.01 | 12.1 |
| 4 | 0 | 1 | 0.1 | 313 |
| 4 | 0 | 4 | 0.1 | 266 |
| 4 | 2 | 4 | 0.1 | 27 |
| 8 | 0 | 1 | 0.1 | 685; 445 |
| 8 | 0 | 4 | 0.1 | 636; 617 |
| 8 | 2 | 4 | 0.1 | 111 |
| 8 | 2 | 6–8 | 0.1 | 130 |

Table 2

Electrolytic decontamination of CH$_3$I in $HNO_3$—$Co^{3+}$

| $HNO_3$ conc. (M) | Fraction of NO gas in feed (vol. %) | Current (A) | Cobalt conc. (M) | Decontamination factor (DF) |
|---|---|---|---|---|
| 4 | 0 | 1 | 0.01 | 5.2 |
| 4 | 0 | 4 | 0.01 | 20; 32 |
| 4 | 1 | 4 | 0.01 | 2.8 |
| 4 | 0 | 1 | 0.1 | 17.5 |
| 4 | 0 | 4 | 0.1 | 6.6 |
| 4 | 1 | 4 | 0.1 | 5.0 |
| 4 | 2 | 4 | 0.1 | 4.5; 3.6 |
| 8 | 0 | 0.5 | 0.1 | 10.4 |
| 8 | 0 | 1 | 0.1 | 24; 15 |
| 8 | 0 | 4 | 0.1 | 93; 113 |
| 8 | 1 | 4 | 0.1 | 9.1 |
| 8 | 2 | 4 | 0.1 | 7.1; 5.6 |
| 8 | 0 | 2.5 | 0.1 | 66 |
| 12 | 0 | 4 | 0.1 | 253 |
| 12 | 0 | 1 | 0.1 | 29.3 |

The data in tables 1 and 2 indicate the effect on $NO_2$ on the decontamination factor. It should be noted that the DF for molecular iodine appears to decrease with increasing current through the cell while the DF for methyl iodine shows a marked increase with increased current. This indicates a different trapping mechanism for the two species.

In an industrial application the electrolytic cell is conveniently regulated by maintaining the anolyte potential. The potential is a function of $HNO_3$ concentration, Co(III) concentration, current and current density. As indicated earlier, the best method for controlling the anolyte potential of the operating cell is to control the applied voltage across the anode and cathode. The anolyte potential can be effectively controlled by connecting the reference electrode to a potentiometer-controller which operates to provide a signal to a rectifier controlling the power to the electrolytic cell. The reference electrode is also electrically connected to the unpowered auxiliary electrode positioned within the anode compartment in the vicinity of the process gas stream passing through. In this manner, a changing anolyte potential produces a signal which is transmitted from the reference electrode to the controller-potentiometer which, in turn, signals the rectifier feeding power to the electrolytic cell, thereby causing an appropriate voltage adjustment.

Figure 3:
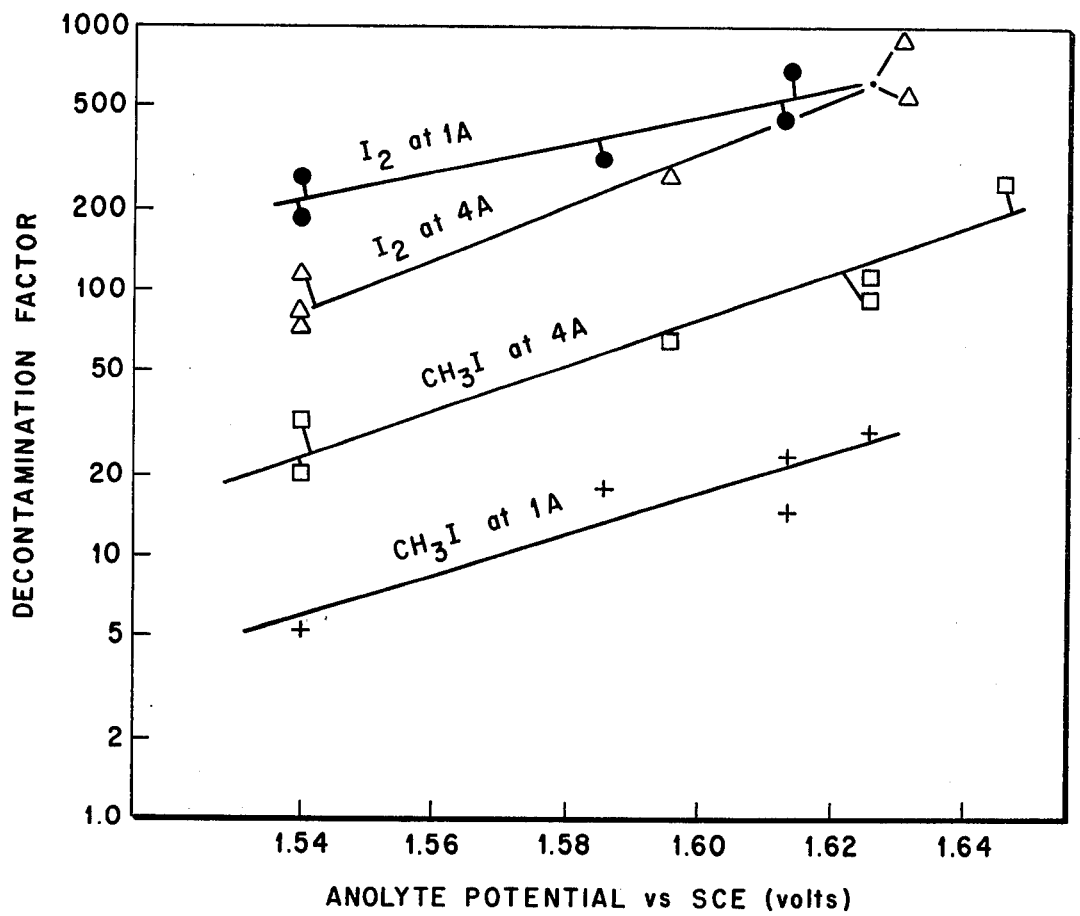
FIG. 3 is a graph showing the decontamination factor as a function of anolyte potential relative to a saturated calomel electrode.

The anolyte potential is a fair indication of the efficiency of the cell. The anolyte potential is not a quantitative measurement of Co(III)/Co(II) concentrations in the anolyte since the oxidation reactions at the platinum electrode are not reversible. FIG. 3 depicts the variation of DF for $I_2$ and $CH_3I$ with the anolyte potential vs. saturated calomel electrode for the various experimental runs represented in the tables. As seen from FIG. 3, the decontamination factors of both $CH_3I$ and $I_2$ are exponential functions of the anolyte potential. In an industrial application the proper anolyte potential for a particular effluent stream can be readily determined.

In the preferred mode of operation, anolyte is continuously withdrawn from the cell (or from the first (bottom) cell in a cascade) and evaporated to dryness, leaving a residue of Co(III) nitrate, iodate, and periodate which is then suitable for radioactive waste disposal. The evaporated nitric acid is condensed and returned to the anode compartments of the cells (after cobalt addition). In the evaporation step, the retention factor of iodine $$\left( \frac{\text{total I in solid}}{\text{total I in condensate}} \right)$$

has been determined to be as high as $3.3 \times 10^4$.

What is claimed is:

1. A method of removing molecular, inorganic, and organic forms of iodine from a gaseous atmosphere, said method comprising contacting said gaseous atmosphere with anolyte of an operating partitioned electrolytic cell, said electrolytic cell comprising an anode compartment containing anolyte and a cathode compartment containing catholyte, said anolyte comprising an aqueous nitric acid solution containing a catalytic amount of cobalt ions to effect the electrolytic oxidation of iodine in said atmosphere to iodine species soluble in said anolyte.

2. The method of claim 1 wherein the concentration of the nitric acid solution in the anolyte is 8–16 M.

3. The method of claim 1 wherein the catholyte comprises an aqueous 8–16 M nitric acid solution containing sufficient soluble nitrite to supress $H_2$ formation.

4. The method of claim 1 wherein said electrolytic cell is operated at a current density sufficiently low to prevent the formation of $NH_3$ in the cathode compartment.

5. The method of claim 1 wherein said gaseous atmosphere is contacted with anolyte of a plurality of said partitioned electrolytic cells in series.

6. The method of claim 5 wherein said anolyte circulates among the anode compartments of said electrolytic cells, counter-currently to said gaseous atmosphere, to concentrate soluble iodine species in the anode compartment of the first of said plurality of electrolytic cells in series.

* * * * *